United States Patent [19]

Sehm

[11] Patent Number: 4,778,737

[45] Date of Patent: Oct. 18, 1988

[54] COMPOSITIONS OF POLYMERS IN ALKALINE MEDIA

[75] Inventor: Eugene J. Sehm, Akron, Ohio

[73] Assignee: The BFGoodrich Company, Akron, Ohio

[21] Appl. No.: 760,367

[22] Filed: Jul. 30, 1985

[51] Int. Cl.[4] .................. H01M 6/04; H01M 4/88
[52] U.S. Cl. ........................... 429/206; 429/190; 429/198; 252/62.2; 252/182.1
[58] Field of Search ............... 429/190, 206, 198; 252/62.2, 182.1

[56] References Cited

U.S. PATENT DOCUMENTS

| | | | |
|---|---|---|---|
| 3,884,722 | 5/1975 | Tucholski | 429/206 X |
| 3,894,572 | 7/1975 | Moore | 427/403 X |
| 3,954,506 | 5/1976 | Sullivan | 429/217 |
| 3,969,147 | 7/1976 | Croissant et al. | 429/206 X |
| 4,113,678 | 9/1978 | Minagawa et al. | 524/180 X |
| 4,125,700 | 11/1978 | Graham | 526/80 X |
| 4,281,047 | 7/1981 | Danzig | 429/217 |
| 4,284,542 | 8/1981 | Boyce et al. | 524/270 X |

Primary Examiner—Brian E. Hearn
Assistant Examiner—Stephen J. Kalafut
Attorney, Agent, or Firm—George A. Kap; Alan A. Csontos

[57] ABSTRACT

This invention is directed to compositions having viscosity aging and/or gas-release properties comprising 4 to 20 weight parts of an alkaline material, particularly an aqueous solution of sodium hydroxide or potassium hydroxide, and 0.05 to 5 weight parts of a suspending copolymer of a major proportion of an acrylic acid and a minor proportion of a comonomer, particularly selected from acrylamide, N-lauryl methacrylamide, lauryl acrylate, 2-ethylhexyl methacrylate, lauryl methacrylate, and stearyl methacrylate. Such compositions can also include 40 to 80 weight parts of an electrochemically active metal, particularly zinc, suspended in the alkaline material by means of said copolymer whereby said composition functions as a component part of an electrochemical cell containing a cathode, an anode, and an electrolyte wherein said metal serves as the anode and said alkaline material serves as the electrolyte.

17 Claims, No Drawings

COMPOSITIONS OF POLYMERS IN ALKALINE MEDIA

BACKGROUND OF THE INVENTION

Polymers of acrylic and like acids, as well as salts thereof, have been used in the past as thickeners in diverse applications. Such polymers are generally homopolymers of an acrylic acid or copolymers thereof with a small amount of a comonomer as well as a small amount of a crosslinking agent. In aqueous or in alkaline environments, such polymers exhibit flat viscosity characteristic and do not impart the ability to vent gases entrapped or internally generated. As thickeners, such polymers are prepared in powder form having particle size on the order of 1 to 10 microns. The small particle size of the polymers may reflect the inability of compositions containing such thickeners to vent gases.

SUMMARY OF THE INVENTION

This invention is directed to compositions comprising a preponderance of an alkaline material and a small amount of a suspending agent and to compositions comprising a preponderance of an electrochemically active metal dispersed in a substantial amount of an alkaline material and suspended in the alkaline material with a small amount of a suspending agent. The suspending agent, in a preferred embodiment, is a copolymer of a preponderance of an acrylic acid or its salt and a small amount of a comonomer. These compositions have the unique property of viscosity growth with time and/or gas release ability.

DETAILED DESCRIPTION OF THE INVENTION

This invention is directed to alkaline compositions which have an initial low viscosity which increases with time. The property of viscosity growth or increase with time is also known as viscosity aging. This invention is also directed to alkaline compositions that allow escape of gas contained therein by entrainment or internal generation. The preferred compositions disclosed herein have both viscosity aging properties and gas release ability.

The compositions described herein generally comprise a preponderance of an alkaline material and a small amount of a suspending agent. The compositions described herein also include those which comprise a preponderance of an electrochemically active metal suspended by means of a small amount of a suspending agent in a substantial amount of an alkaline material. The suspending agent is a high molecular weight copolymer of a major proportion of an olefinically monounsaturated carboxylic acid and a minor proportion of a comonomer that appears to impart the desired properties to the suspending agent, which in turn, causes compositions containing same to exhibit aging and/or gas release properties. Such copolymers are devoid of crosslinkers. Examples of suitable comonomers include lauryl methacrylate, stearyl methacrylate, 2-ethylhexyl methacrylate, N-lauryl methacrylamide, lauryl acrylate, acrylamide, and mixtures thereof. All of the above comonomers, except lauryl acrylate and acrylamide, when copolymerized with a monounsaturated carboxylic acid, result in suspending agents which, in an alkaline medium, exhibit both the aging and gas release properties, whereas lauryl acrylate and acrylamide yield suspending agents which appear to have only the gas release but not the viscosity aging properties.

This invention is also directed to compositions noted above containing a suspending agent that is a blend of at least one of the above copolymers which impart at least one of the desired properties and at least one of modifying copolymer. The modifying copolymers do not impart either aging or gas release properties to the compositions described herein, however, they do have the property of suspending an electrochemically active metal in an alkaline material. Such blends can also be prepared to give modified viscosity aging whereby viscosity increases with time at a lower or a higher viscosity level. Such blends can also be prepared to result in mixtures that do not harden with time.

Certain of the modifying copolymers were prepared but were found to yield relatively flat viscosity with time rather than viscosity that increased with time. Amount of the comonomers used in the preparation of the modifying copolymers varied from about 0.01 to 10 weight parts per 100 weight parts of the carboxylic acid. These comonomers included lauryl acrylate, n-octyl acrylate, isodecyl methacrylate, acrylamide, monomethacrylate ester of polyethylene oxide with 5 and 10 moles of polyethylene oxide, and divinyl glycol.

The suspending agents described herein are more than merely thickeners. Whereas thickeners merely function to thicken or increase viscosity of a medium, they do not necessarily immobilize a particle in the thickened medium. The suspending agents not only thicken a medium, but also immobilize a metal particle so that the metal particle does not slowly drop to the bottom or float to the top.

The compositions noted herein find specific applications were there is a ned for a material having an initially low viscosity which increases with time and eventually stabilizes at a higher viscosity. Furthermore, these compositions also find uses in applications were there is a need to release gases which are either entrapped during mixing or which are generated internally, as through a reaction between ingredients in the compositions. Specific applications contemplated herein include electrochemical cells containing a cathode, an anode, and an electrolyte whereby an active metal is suspended in an alkaline material by means of a small amount of the suspending agent described herein.

The polymeric suspending agents described herein are copolymers and salts thereof. The salts can be prepared by reacting the copolymer in acid form with a neutralizing agent selected from alkali metal, alkaline earth metal, ammonium and amine alkaline materials. The copolymers in either acid or salt form are swellable in an alkaline medium. Preferred alkaline materials are aqueous sodium and potassium hydroxides. The copolymers described herein have the unexpected property of swelling in highly alkaline environments, such as at pH of 10 to 14, preferably 12 to 14.

Copolymers suitable for the purposes herein are prepared by copolymerizing at least one monounsaturated carboxylic acid or a salt thereof with at least one comonomer which results in a copolymer which has viscosity aging property, can release internal gases, or can suspend a metal in an alkaline material. A preponderance of the acid or its salt is used relative to the comonomer. The acid or its salt contain 3 to 8, preferably 3 to 6 carbon atoms. More specifically, amount of one or more suitable comonomers is about 0.1 to 20, preferably 0.5 to 10 weight percent, based on the monomers to be polymerized. Remainder of the monomer mixture is one or more of the unsaturated carboxylic acids or salts thereof. Suitable comonomers that can be copolymerized with the carboxylic acid monomers or salts thereof generally include acrylamide, methacrylamide, and alkyl acrylates, methacrylates, acrylamides, and methacrylamides containing 6 to 24, preferably 8 to 18 carbon atoms in the alkyl group.

Polymerization can be carried out in an aqueous medium of a soluble nonredox multivalent inorganic salt. The acid is too soluble in plain water, therefore, the inorganic salt is added to insolubilize the acid. In this manner, another phase is introduced and the acid is polymerized in a suspension rather than in solution.

The aqueous medium can be a concentrated solution of the salt or it can be a salt slurry of the salt. The difference between the two is considerable. Whereas a concentrated solution of magnesium sulfate salt at reaction temperature is composed of about 2.5 weight parts of the salt per single weight part of water, a slurry of the salt is composed of about 20 weight parts of the salt per single weight part of water. The use of a concentrated salt solution as the reaction medium is preferred.

Although magnesium sulfate is the preferred salt, other organic salts or hydrates thereof can be used, including the nonredox multivalent ion salts such as potassium sulfate, calcium chloride, secondary sodium phosphate and salts employing combinations of anions and cations such as aluminum, barium, beryllium, cadmium, calcium, chloride, chromium, cobalt, lead, magnesium, manganese, molybdate, nickel, selenate, strontium, sulfate, tin, tungsten, zinc, and the like.

Success of the polymerization method employed depends on the fact that the polymerization reaction takes place in discrete and separate oil-in-water droplets. Therefore, water solubility of the inorganic salt employed should be at least about one-half molar in order to salt out the monomer and the formed water-soluble polymer. Moreover, the readily soluble salts can be readily washed out of the finished polymer.

Suitable unsaturated carboxylic acids and salts thereof can be used herein, including acrylic acid, methacrylic acid, fumaric acid, maleic acid, maleic anhydride, itaconic acid, chloroacrylic acid, alpha sulfoacrylic acid, alpha aminoacrylic acid, mixtures thereof and other mentioned in the literature. Acrylic acid is the preferred monounsaturated carboxylic acid monomer. Suitable comonomers include 2-ethylhexyl methacrylate, lauryl methacrylate, stearyl methacrylate, N-lauryl methacrylamide, lauryl acrylate, acrylamide, mixtures thereof, and other comonomers which result in copolymers with the above acids or salts which increase in viscosity with time, which have the gas venting property, and which suspend an electrochemically active metal in an alkaline material.

Copolymerization initiators are employed in an amount of 0.01 to 1 weight percent, based on the weight of all monomers. Examples of such initiators include benzoyl peroxide, 2,2'-azobisisobutyronitrile, potassium persulfate, acetylperoxide, di-tertiary butylperoxide, cumene hydroperoxide, 2,2'-azobis(2-methylbutyronitrile), and the like. No crosslinking agent is used in the polymerization of the principal copolymers described herein although the modifying copolymers can be prepared in the presence of conventional crosslinking agents.

The polymerization reaction is conducted at a temperature above room temperature and up to the reflux temperature of the mixture. Optimum reaction temperature for acrylic acid in magnesium sulfate is about 75° to 95° C. Pressure can be applied by means of an inert gas such as nitrogen, carbon dioxide, or any of the rare gases, to control the reflux temperature. Total solids concentration in the polymerization is about 12 weight percent. After a period of time, which normally does not exceed two hours, polymerization is completed, as evidenced by the formation of the copolymer in solid form. The materials are then separated by filtration, or by other known methods of isolation.

The resulting copolymer is in solid form with a particle size of about 1/16" to ⅛" in diameter. This product is then ground to the preferred particle size on the order of about 50–200 microns.

To convert an acid copolymer to its salt, a stoichiometric quantity of an alkaline material with a polyvalent metallic cation is added to the aqueous suspension of the acid copolymer and thoroughly stirred. Stirring is continued until the acid copolymer is neutralized, which can take 3 to 10 hours. The resulting resin salt can then be separated by filtration, washed, and dried at 60°–80° C. The acidic polymer employed for salt formation is one which is in a swollen state following the washing step but before drying. Where a dried resin is used, it is allowed to swell in water with stirring for about one-half hour before salt formation or neutralization is carried out. The alkaline material can be added in a slight excess to ensure complete neutralization.

As was mentioned earlier, the copolymers described herein, when mixed with a relatively large amount of an alkaline material, show a number of unexpected properties. For instance, viscosity studies have shown that certain of the copolymers prepared with selected comonomers have unique viscosity characteristics in concentrated aqueous solutions containing 35 to 45% by weight of an alkaline material. These studies were made with copolymers of acrylic acid and comonomers selected from stearyl methacrylate, lauryl methacrylate, 2-ethylhexyl methacrylate, and N-lauryl methacrylamide. When mixtures of 40% potassium hydroxide were prepared with 2.3 weight percent of these copolymers, the resulting mixtures had a low initial viscosity which increased with time. This is a desired attribute since it permits working of the mixture as in filling, mixing, pumping, wetting, leveling, and the like. The high final viscosity is also desirable since it stabilizes and immobilizes the system in terms of physical arrangement and performance thereof, as in an electrochemical cell.

An example of a copolymer with the viscosity aging property is the acrylic acid copolymer. The acrylic acid copolymer with 6 weight percent stearyl methacrylate, at 2.3% thereof in 40% potassium hydroxide, had initial viscosity of 3,000 cps which increased to 22,000 cps after three days, and to 88,000 cps after seven days. The initial low viscosity permits handling and filing of the mixture, as into miniature cells, and the final high viscosity is desired since it sets up or immobilizes the materials against shifting and drainage when a device is turned on its side or is used in a position which does not conform to the original one.

Viscosity aging can be altered by mixing or blending a copolymer that does exhibit viscosity aging with one which does not. For instance, copolymer A was prepared by polymerizing 100 weight parts acrylic acid with 1 weight part stearyl methacrylate and copolymer D was prepared by polymerizing 80 weight parts acrylic acid and 20 weight parts acrylamide. Copolymer A is an example of a copolymer which shows viscosity aging whereas copolymer D is an example of a copolymer which does not. Copolymer A was blended with different amounts of copolymer D to produce blends which were then evaluated for their viscosity characteristics. Results of such viscosity evaluations are shown in Table I below:

TABLE I

| | Viscosity After Indicated Days × $10^3$ | | | | |
|---|---|---|---|---|---|
| | 1 | 3 | 5 | 7 | 10 |
| Copolymer A-100% | 10 | 73 | 94 | 101 | 102 |
| Cop A/Cop D-75:25 | 13 | 52 | 72 | 81 | 85 |
| Cop A/Cop D-50:50 | 15 | 39 | 55 | 65 | 76 |
| Copolymer D-100% | 16 | 17 | 18 | 18 | — |

As is apparent from Table I, above, viscosity of copolymer A was low initially but increased substantially over a period of ten days. Viscosity of copolymer D, on the other hand, was low initially and remained low throughout the seven days of testing. It is interesting to note, however, that blends of the two copolymers each showed viscosity aging in the viscosity range between that for copolymer A and copolymer D, generally in direct relationship to content of the particular copolymer, with each, however, showing the viscosity aging property. It appears that increasing the content of acrylamide in the copolymer blends decreases the a effects on viscosity.

Gas-venting tests were also carried out on the copolymers described herein in an alkaline matrial. Although homopolymers of acrylic acid were, likewise, tried, they did not show gas-venting properties. This may be due to the differences in particle size Whereas the homopolymers of acrylic acids have a particle size of about 1-10 microns, the copolymers described herein, after grinding, have particle size of 50-200 microns. The gas-venting tests were carried out by preparing mixtures of copolymers in 40% potassium hydroxide and checking density. Mixtures that had densities use to that of potassium hydroxide were regarded as having gas-venting property. In this set of tests, the copolymers containing small amounts of stearyl methacrylate and acrylamide were considered to be excellent gas-venters.

The gas-venting copolymers, in certain instances, can be the same as the copolymers that show viscosity aging. However, some of the gas-venting copolymers are different from the viscosity aging copolymers in having different comonomers. In some instances, the comonomer can be selected from conventional crosslinkers and used in a very small amount of about 0.01 to 0.1 weight percent of the monomers. It was found that such copolymers have gas-venting property but not the viscosity aging property.

Suitable crosslinkers for the above purposes include particularly diallyl sucrose, divinyl benzene, 2,5-dimethyl-3,4-dihydroxy-1,5-hexadiene, and divinyl glycol, i.e., 3,4-dihydroxy-1,5-hexadiene; as well as N,N-diallylacrylamide, divinylether of diethylene glycol, trivinyl benzene, 1,3,5-triisopropenyl-benzene, 4,6-dimethyl-4,6-dihydroxy-1,8-nonadiene, and the like.

The principal application for the copolymers described herein is in an are alkaline electrochemical cell or batteries which comprise a plurality of cells. Such cells are characterized by the presence of a cathode, an electrochemically active metal anode, and an electrolyte of an alkaline material. Any electrochemically active or sacrificial anodic metal that is known to be useful in alkaline cells can be used here. Although zinc is preferred, other suitable metals include iron and cadmium. For the cathode in an alkaline cell, various materials have been used, including hydroxides and oxides of nickel, copper, silver, mercury, manganese, as well as oxygen itself. The alkaline material is selected from those containing alkaline earth metals and alkali metals, particularly hydroxides thereof. Potassium hydroxide or sodium hydroxide are normally used in miniature batteries, depending on requirements. Potassium hydroxide, such as 40% aqueous KOH, is usually used when steady pulsing is required, such as LED watches, whereas sodium hydroxide is used where there is no such requirement.

The copolymers which impart viscosity aging and/or gas venting properties to the alkaline mixtures containing a sacrificial metal, have other unique properties. Such copolymers swell in an alkaline medium at a very high pH to suspend the metal. In this fashion they impart high viscosity at high pH but at a low usage level. Such copolymers imbibe the alkaline material and are stable in a battery environment.

For use in batteries, a mixture of a sacrificial metal, a copolymer suspending agent, and an alkaline material should be viscous and flowable but should not set-up into a hard substance. As a guideline, a mixture with viscosity of up to about 150,000 cps measured at 1 rpm and at 25° C. is readily flowable whereas mixtures of higher viscosities, are not. To prevent undue growth in viscosity, it is possible to mix the copolymers which have the viscosity aging property with copolymers which have relatively flat viscosity with time. For instance, copolymers of acrylic acid and stearyl methacrylate have been mixed with copolymers of acrylic acid and acrylamide to obtain copolymer blends which do not harden with time.

It should be understood that the copolymers described herein can be used in standard alkaline batteries and in miniature alkaline batteries as well. Typical recipes for the two types of batteries, in weight percent, are as follows:

| Material | Std. Alkaline Battery | Miniature Alkaline Battery |
|---|---|---|
| Zinc | 57 | 68 |
| Copolymer | 1 | 2 |
| Mercury | 5 | 5 |
| KOH (40%) | 37 | 25 |
| | 100% | 100% |

The resulting pH of the mixture is about 13.

For purposes herein, alkaline batteries use mixtures comprising an electrochemically active metal, a copolymer described herein which functions as a suspending agent for the metal, and an alkaline material. Relative amounts of each are given below in weight parts:

| Material | Broad Range | Preferred Range |
|---|---|---|
| Metal | 40-80 | 45-75 |
| Copolymer | 0.05-5 | 0.2-2 |
| Alkaline Material | 4-20 | 8-18 |

Mercury can also be used at a level of about several percent as modifier for the active metal. Normally, amount of mercury used is 2 to 8 weight parts, relative to the materials given above. Other materials can also be used, pursuant to conventional practice in the art.

Preparation of the battery mixtures can be accomplished by the dry or the wet processes. In the wet process, the alkaline material in an aqueous medium is mixed with the metal and the suspending agent, as well as other materials, before the mixture is placed in a battery. Since the metal and the suspending agent are particulate, the mixture must be thoroughly agitated, which results in entrainment of air. It was discovered that the wet method can be effectively utilized since initial viscosity of the mixture is low and it can be easily worked. Initial viscosity of the mixture increases with time to set-up the mixture in a few days, which is desirable. Furthermore, it was also discovered that the copolymer, after grinding to powder, has a relatively course particle size on the order of 20-500 microns, preferably 50-200 microns, which permits the mixture to release any generated or entrained gases.

In the dry process, the particulate metal is mixed with the particulate copolymer suspending agent in order to have a dispersed mixture of the two materials. The mixture is then placed in a container followed by addition of the aqueous alkaline material. Although viscosity aging is not a critical property here, what is necessary is rapid uptake or absorption of the alkaline material, gas release, and suspension of the metal by the suspending agent, all of which is provided by the copolymer.

Illustrative examples of certain aspects of the invention described herein, are given below. Such aspects include preparation of a copolymer, viscosity studies of certain of the copolymers in an alkaline medium, and density studies of certain of the copolymers in an alkaline medium reflecting gas-release properties.

EXAMPLE 1

This example demonstrates preparation of a copolymer of 100 weight parts acrylic acid and 1 weight part stearyl methacrylate in aqueous magnesium sulfate with 2,2'-azobis(2-methylbutyronitrile) polymerization initiator.

Prior to commencement of polymerization, the following mixtures A and B were separately prepared:

| Mixture A | |
|---|---|
| MgSO$_4$.7H$_2$O | 1435 grams |
| Distilled water | 565 grams |
| Mixture B | |
| Acrylic Acid (100 wt parts) | 235 grams |
| Stearyl Methacrylate (1 wt. Part) | 2.40 grams |
| Initiator (0.2 wt. part) | 0.47 gram |

A 3-liter reactor was used with an agitator. The reactor was flushed with nitrogen and the temperature recorder was calibrated. Mixture A was added to the reactor with stirring and heated to 82° C. When the temperature of the mixture in the reactor reached 82° C., one-half of mixture B was added thereto, also with stirring. There was immediate evidence of copolymer formation. In about 5 minutes, remainder of mixture B was added to the reactor. The temperature increased to 95° C. in about two minutes and then was maintained at 95° C. for two hours. The reactor at this point contained a white, fluid slurry. Heat and the stirrer were turned off and the reaction mixture was filtered through cheese-cloth, with 1828 g of magnesium sulfate solution being recovered. For the first wash, 3 liters of distilled water was used, which swelled the copolymer. The first filtrate was cloudy. For the second wash, 3 liters of distilled water was also used, which further swelled the copolymer. TThe second filtrate was also cloudy. The third wash also used 3 liters of distilled water, which resulted in very swollen copolymer particles. The third filtrate was slightly cloudy. For the fourth wash, 2500 ml of distilled water was used and the resulting filtrate was slightly cloudy. At this point, the copolymer was highly swollen polymer consisting of ⅛" to ¼" diameter irregular particles that are transluscent. The copolymer was then placed in Teflon coated pans to dry and was dried at 70° C. in an air oven for 16 hours. The copolymer was recovered at 96.4% yield and was then milled in a Fritch mill for 2 hours, which yielded a copolymer of a particle size on the order of 50-200 microns.

In a like manner other copolymers were prepared, using acrylic or methacrylic acids with the following comonomers: acrylamide, polyethylene glycol monomethacrylate, isodecyl methacrylate, 2-ethylhexyl methacrylate, N-octyl acrylate, and divinyl glycol.

EXAMPLE 2

This example demonstrates viscosity aging of alkaline mixtures containing a small amount of the copolymers described herein.

The mixtures were prepared by mixing 2.3% by weight of a copolymer with 40% aqueous potassium hydroxide and allowed to age at room temperature. The copolymers were those of 100 weight parts acrylic acid and comonomers used in the indicated amount in weight parts. Viscosity in cps was measured with an RV model Brookfield viscometer at 1 RPM. Results of the viscosity studies are given in Table II, below:

TABLE II

| Copolymer | Comonomer & Amount | | Viscosity At Day Intervals | | | | | | | | | |
|---|---|---|---|---|---|---|---|---|---|---|---|---|
| | | | 1 | 2 | 3 | 4 | 5 | 6 | 7 | 8 | 9 | 10 |
| A | Stearyl Methacrylate | −9 | 1,600 | 20,000 | — | — | — | — | 66,400 | — | — | — |
| B | Stearyl Methacrylate | −6 | 3,600 | 22,000 | — | — | — | — | 88,000 | — | — | — |
| C | Stearyl Methacrylate | −3 | 3,600 | 92,000 | — | — | — | 110,800 | — | 114,000 | — | — |
| D | Stearyl Methacrylate | −3 | 9,200 | 74,000 | — | — | — | 122,400 | — | — | 118,800 | — |
| E | Stearyl Methacrylate | −2 | 8,400 | 73,600 | — | — | — | — | — | — | — | 144,000 |
| F | Stearyl Methacrylate | −1 | 14,000 | — | — | 106,000 | — | — | — | — | — | — |
| G | Stearyl | −1 | 8,000 | 57,600 | — | — | — | — | 88,800 | 86,400 | — | — |

TABLE II-continued

| Copolymer | Comonomer & Amount | | Viscosity At Day Intervals | | | | | | | | | |
|---|---|---|---|---|---|---|---|---|---|---|---|---|
| | | | 1 | 2 | 3 | 4 | 5 | 6 | 7 | 8 | 9 | 10 |
| H | Methacrylate Stearyl Methacrylate | −1 | 17,600 | — | — | — | 85,600 | — | — | — | — | — |
| I | Lauryl Methacrylate | −1 | 53,600 | 110,800 | — | — | — | 114,800 | — | 114,000 | — | — |
| J | N—Lauryl Methacrylamide | −1 | 2,400 | 7,600 | — | — | — | 17,600 | — | 24,800 | — | — |
| K | 2-Ethylhexyl Methacrylate | −1 | 248,000 | 372,000 | — | — | — | 316,000 | — | — | — | — |
| L | 2-Ethylhexyl Methacrylate | −3 | 28,400 | 82,000 | — | — | — | 120,800 | — | 128,000 | — | — |

As is apparent from Table II, all of the copolymers tested and reported in Table II, have a lower initial viscosity then viscosity beyond the first day. For instance, copolymer A was a copolymer of 100 weight parts of acrylic acid and 9 weight parts of stearyl methacrylate. This copolymer, when mixed with 40% KOH containing 2.3% by weight of the copolymer, had initial viscosity of 1,600 cps which increased to 20,000 the second day, and to 66,400 cps the seventh day. In the case of copolymer K, which was a copolymer of 100 weight parts acrylic acids and 1 weight part 2-ethylhexyl methacrylate, initial viscosity was 248,000 cps which increased to 372,000 cps the second day but then dropped to 316,000 cps the sixth day. What is important here, of course, is the fact that initial viscosity was substantially lower than subsequent viscosity. Viscosity aging can be accelerated by heat aging of the mixtures.

Copolymers prepared with some other comonomers, similarly tested, did not exhibit the viscosity aging demonstrated herein. Furthermore, certain homopolymers of acrylic acid could not be dispersed in aqueous potassium hydroxide or were dispersed therein with great difficulty.

EXAMPLE 3

This example demonstrates gas-venting property of the copolymers described herein when mixed with an alkaline material.

Various copolymers of 100 weight parts acrylic acid and comonomers in the indicated weight parts were mixed in amount of 2.3% by weight thereof with 40% aqueous potassium hydroxide. The copolymers were prepared as described herein and then were milled to provide copolymers of a particle size on the order of 50-200 microns in diameter. After mixing the copolymers with aqueous potassium hydroxide, density in g/cc was measured of the mixtures one hour and 24 hours or one day after preparation of the mixtures. Results of the density tests are given in Table III, below:

TABLE III

| Copolymer | Comonomer & Amount | | Density, g/cc | |
|---|---|---|---|---|
| | | | 1 hr. | 1 day |
| 1 | 2-Ethylhexyl Methacrylate | −3 | 1.33 | 1.33 |
| 2 | Lauryl Acrylate | −3 | — | 1.33 |
| 3 | Lauryl Methacrylate | −1 | 1.31 | 1.31 |
| 4 | Lauryl Acrylate | −1 | 1.32 | 1.33 |
| 5 | Stearyl Methacrylate | −1 | 1.34 | 1.36 |
| 6 | Acrylamide | −4.2 | 1.37 | 1.38 |
| 7 | Divinyl Glycol | −0.04 | 1.37 | 1.37 |

Since density of 40% KOH is 1.385, it should be apparent that those mixtures with densities closest to 1.385 are apparently best gas-venters. Based on the above results, the acrylic acid copolymers prepared with the comonomers of 2-ethylhexyl methacrylate, lauryl acrylate, and lauryl methacrylate appear to be good gas-venters whereas the copolymers with stearyl methacrylate, acrylamide and divinyl glycol appear to be very good gas-venters. The divinyl glycol is not a comonomer in the sense described herein since it is regarded as a crosslinker, however, at a very small amount of 0.04 weight part per 100 weight parts of acrylic acid, it results in a copolymer which has outstanding gas-release properties.

It is surprising to see that certain of the comonomers can be copolymerized with an unsaturated carboxylic acid to yield copolymers that have gas-release properties since some of closely related comonomers do not impart such a property to the corresponding copolymers. In cases where the copolymers were deemed to have insufficient gas-release properties, densities of the corresponding mixtures were on the order of about 1.2 g/cc.

I claim:

1. Composition having viscosity aging property comprising a preponderent proportion of an alkaline material having distributed therethrough a small amount of a polymer, said polymer being an uncrosslinked principal copolymer consisting essentially of a perponderance of at least one monounsaturated carboxylic acid or its salt of 3 to 8 carbon atoms and a small amount of at least one suitable comonomer which imparts the viscosity aging property to said copolymer.

2. Composition of claim 1 wherein said alkaline material contains a metal selected from alkali metals and alkaline earth metals; said comonomer is selected from 2-ethylhexyl methacrylate, lauryl methacrylate, stearyl methacrylate, N-lauryl methacrylamide, and mixtures thereof; relative amounts of said components being 0.05 to 5 weight parts of said polymer or its salt per 4 to 20 weight parts of said alkaline material.

3. Composition of claim 1 wherein said alkaline material is selected from aqueous solutions of sodium hydroxide, potassium hydroxide, and mixtures thereof; said acid is selected from acrylic acid, methacrylic acid, mixtures thereof, and salts of said acids; said comonomer is selected from 2-ethylhexyl methacrylate, lauryl methacrylate, stearyl methacrylate, N-lauryl methacrylamide, and mixtures thereof; amount of said comonomer in said copolymer being 0.1 to 20 weight parts per 80 to 99.1 weight parts of said acid or salt, based on a total of 100 weight parts of said comonomer and said acid or salt; relative amounts of said components being 0.2 to 2 weight parts of said principal copolymer or its salt per 8 to 18 weight parts of said alkaline material, on dry basis.

4. Composition of claim 3 wherein said principal copolymer has a particle size on the order of 20 to 500 microns and is prepared in absence of a crosslinker in an aqueous medium containing a nonredox multivalent ion containing salt and an effective amount of a polymerization initiator.

5. Composition of claim 3 wherein said acid is acrylic acid or its salt, and said principal copolymer has a particle size on the order of 50 to 200 microns which is prepared in absence of a crosslinker in an aqueous medium containing magnesium sulfate and an effective amount of a polymerization initiator.

6. Composition of claim 2 wherein said alkaline material is selected from aqueous solutions of sodium hydroxide, potassium hydroxide, and mixtures thereof; said acid is selected from acrylic acid, methacrylic acid, mixtures thereof, and salts thereof; amount of said comonomer being 0.5 to 10 weight parts and amount of said acid or salt being 90 to 99.5 weight parts, based on a total of 100 weight parts of said comonomer and said acid or salt; relative amounts of said components being 0.2 to 2 weight parts of said principal copolymer or its salt per 8 to 18 weight parts of said alkaline material, on dry basis.

7. Composition of claim 2 wherein said polymer is a blend of at least one of said principal copolymers and at least one of said modifying copolymers that do not impart the viscosity aging property but do when used in conjunction with at least one of said principal copolymers.

8. Composition of claim 7 wherein said modifying copolymer is selected from copolymers of an acid selected from acrylic acid, methacrylic acid, and mixtures thereof.

9. Composition of claim 7 wherein said modifying copolymer is also selected from copolymers of an acid selected from acrylic and methacrylic acids and a copolymerizable diethylenically unsaturated crosslinking agent in amount of 0.01 to 0.1 weight part, based on the weight of all monomers.

10. Composition having viscosity aging and gas release properties comprising 8 to 18 weight parts of an alkaline material selected from sodium hydroxide, potassium hydroxide, and mixtures thereof, said alkaline material being in the form of an aqueous solution; and 0.2 to 2 weight parts of a copolymer of 90 to 99.5 weight parts of an acrylic acid selected from acrylic acid, methacrylic acid, mixtures thereof, and salts thereof, with 0.5 to 10 weight parts of a comonomer selected from 2-ethylhexyl methacrylate, lauryl methacrylate, stearyl methacrylate, and mixtures thereof, based on 100 weight parts of said acid and said comonomer.

11. Composition having viscosity aging and/or gasventing property comprising a perponderant proportion of an alkaline material having distributed therethrough a small amount of a polymer, said polymer being a principal copolymer of a preponderance of a monounsaturated carboxylic acid or its salt of 3 to 8 carbon atoms and a small amount of a suitable comonomer, said composition also including 40 to 80 weight parts of an electrochemically active particulate metal dispersed throughout said composition and suspended therein by means of said polymer.

12. Composition of claim 11 wherein said alkaline material contains a metal selected from alkali metals and alkaline earth metals; said comonomer is selected from 2-ethylhexyl methacrylate, lauryl methacrylate, stearyl methacrylate, N-lauryl methacrylamide, and mixtures thereof; relative amounts of said components being 0.05 to 5 weight parts of said polymer or its salt per 4 to 20 weight parts of said alkaline material.

13. Composition of claim 11 wherein said alkaline material is selected from aqueous solutions of sodium hydroxide, potassium hydroxide, and mixtures thereof; said acid is selected from acrylic acid, methacrylic acid, mixtures thereof, and salts of said acids; said comonomer is selected from 2-ethylhexyl methacrylate, lauryl methacrylate, stearyl methacrylate, N-lauryl methacrylamide, and mixtures thereof; amount of said comonomer in said copolymer being 0.1 to 20 weight parts per 80 to 99.1 weight parts of said acid or salt, based on a total of 100 weight parts of said comonomer and said acid or salt; relative amounts of said components being 0.2 to 2 weight parts of said principal copolymer its salt per 8 to 18 weight parts of said alkaline material, on dry basis.

14. Composition of claim 12 including a sufficient amount of mercury to react with any evolved hydrogen; wherein said acid is acrylic acid or its salt, and said principal copolymer has a particle size on the order of 50 to 200 microns which is prepared in absence of a crosslinker in an aqueous medium containing magnesium sulfate and an effective amount of a polymerization initiator.

15. Composition of claim 13 including 2 to 8 weight parts of mercury; and wherein said metal is zinc and amount thereout being 45 to 75 weight parts.

16. In an electrochemical cell containing a cathode, an anode, and an electrolyte, the improvement in said anode comprising 8 to 18 weight parts alkaline material selected from sodium hydroxide, potassium hydroxide, and mixtures thereof, said alkaline material being in an aqueous solution; 0.2 to 2 weight parts uncrosslinked copolymer of 90 to 99.5 weight parts of an acrylic acid selected from acrylic acid, methacrylic acid, mixtures thereof, and salts thereof, with 0.5 to 10 weight parts of comonomer selected from N-lauryl methacrylamide, 2-ethylhexyl methacrylate, lauryl methacrylate, stearyl methacrylate, and mixtures thereof; and 45 to 75 weight parts particulate electrochemically active metal.

17. Electrochemical of claim 16 including 2 to 8 weight parts of mercury; wherein said comonomer is selected from 2-ethylhexyl methacrylate, N-lauryl methacrylamide, lauryl methacrylate, stearyl methacrylate, and mixtures thereof; and said metal is zinc which is suspended within said alkaline material by means of said copolymer.

* * * * *